(No Model.)
T. M. CHAPMAN.
FRICTION ROLL.
No. 253,183. Patented Feb. 7, 1882.
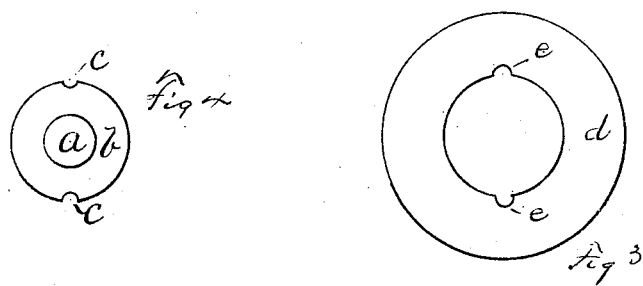
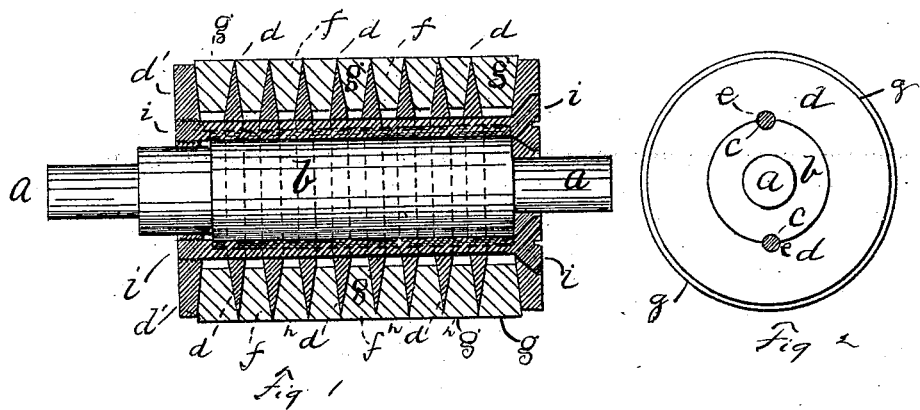
Witnesses
Inventor
Thomas M Chapman

UNITED STATES PATENT OFFICE.

THOMAS M. CHAPMAN, OF OLD TOWN, MAINE.

FRICTION-ROLL.

SPECIFICATION forming part of Letters Patent No. 253,183, dated February 7, 1882.

Application filed July 26, 1881. (No model.)

*To all whom it may concern:*

Be it known that I, THOMAS M. CHAPMAN, of Old Town, in the county of Penobscot and State of Maine, have invented certain new and useful Improvements in Friction-Rolls; and I do hereby declare that the following is a full, clear, and exact description of the invention, that will enable others skilled in the art to which it appertains to make and use the same, reference being had to the accompanying drawings, forming a part of this specification, in which—

Figure 1 shows a side elevation of my roll, partially in section; Fig. 2, end view with outer disks removed; Fig. 3, side view of disk; Fig. 4, end view of roll and shaft.

Same letters show like parts.

My invention consists of an improved friction-roll of that class having an elastic surface so constructed as to obviate all possibility of said surface slipping or shifting on the roll. It will be readily understood by reference to the accompanying drawings.

At $a$ is shown a shaft having the roll $b$ thereon, of any required size and provided with the grooves $c\ c$.

At $d\ d\ d$ are metallic disks having a central opening fitting said roll $b$, and holes $e$, corresponding with the grooves $c$ and forming therewith a circular hole. These disks form tapering openings $f\ f$ for the reception of annular rings $g$, of rubber or like material, the side surfaces of which, in contact with the disks $d\ d$, are greater than the edge $h$.

At $i\ i$ are screws extending through the grooves $c$, and holes $e$, preventing rotation. The outer disk, $d'$, is threaded to receive said screws, thus holding all the parts compactly together, and compressing the rubber disks to any required extent between the metallic disks, the latter being kept apart simply by the intervening rubber.

I do not claim the invention shown in the clothes-wringer roll patents of Holly and Smith, No. 39,201; G. P. Clark, No. 179,399; nor John Critcherson, No. 34,394. My invention is intended for a different purpose—viz., to run machinery by friction—and its chief material is metal, and, in addition to this, it varies greatly in construction from the cases cited.

What I claim as my invention is—

In a friction-roller having alternate rubber and metallic disks $g\ g\ d\ d$, the former projecting beyond the latter and having side surfaces of greater extent than their edge surfaces, the combination of the shaft $a$, roll $b$, having longitudinal grooves $c\ c$ therein, perforations $e$ in said disks corresponding to said grooves, and screws $i\ i$, passing through said grooves and through the holes $e$, and serving both as splines and to hold the parts together, as set forth.

In testimony that I claim the foregoing I have hereunto set my hand this 20th day of July, 1881.

THOMAS M. CHAPMAN.

Witnesses:
 CLARK WOODBURY,
 JOHN A. BLANCHARD.